March 27, 1962  A. H. FOTSCH ETAL  3,026,778
MACHINE TOOL
Filed Feb. 28, 1957  5 Sheets-Sheet 3
Fig. 5
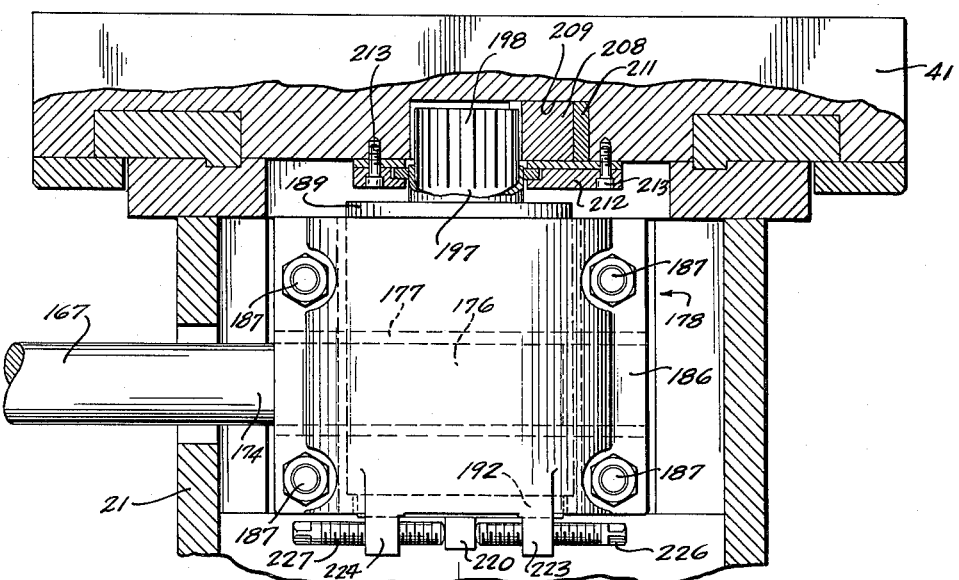
Fig. 6
Fig. 7
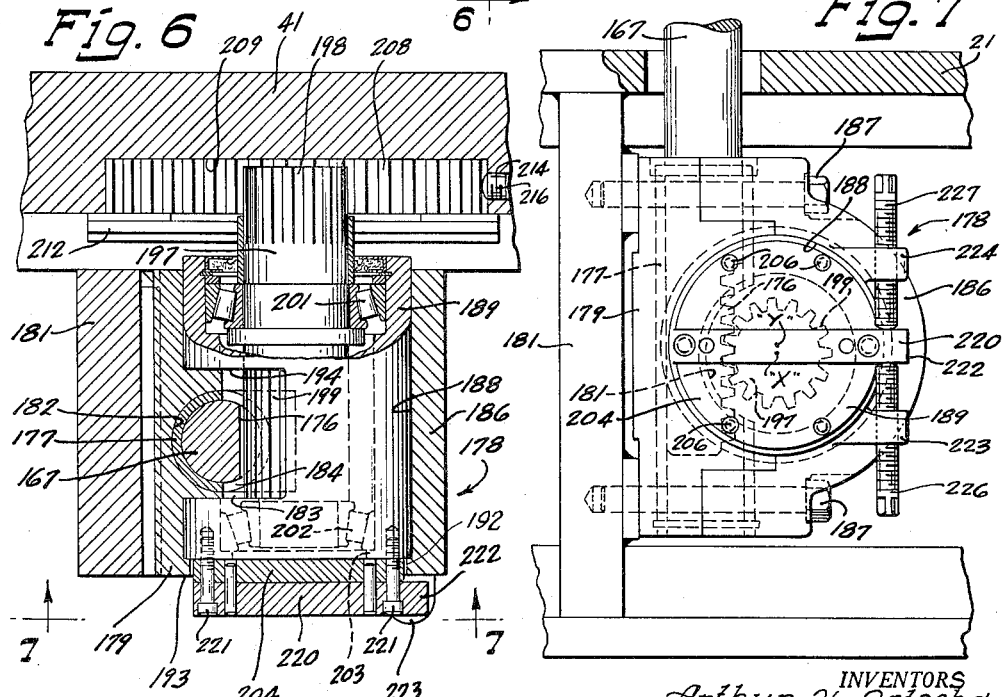
INVENTORS
Arthur H. Fotsch &
John G. Jorgenson
BY
Elroy J. Wutschel
Attorney March 27, 1962 A. H. FOTSCH ETAL 3,026,778
MACHINE TOOL
Filed Feb. 28, 1957 5 Sheets-Sheet 4

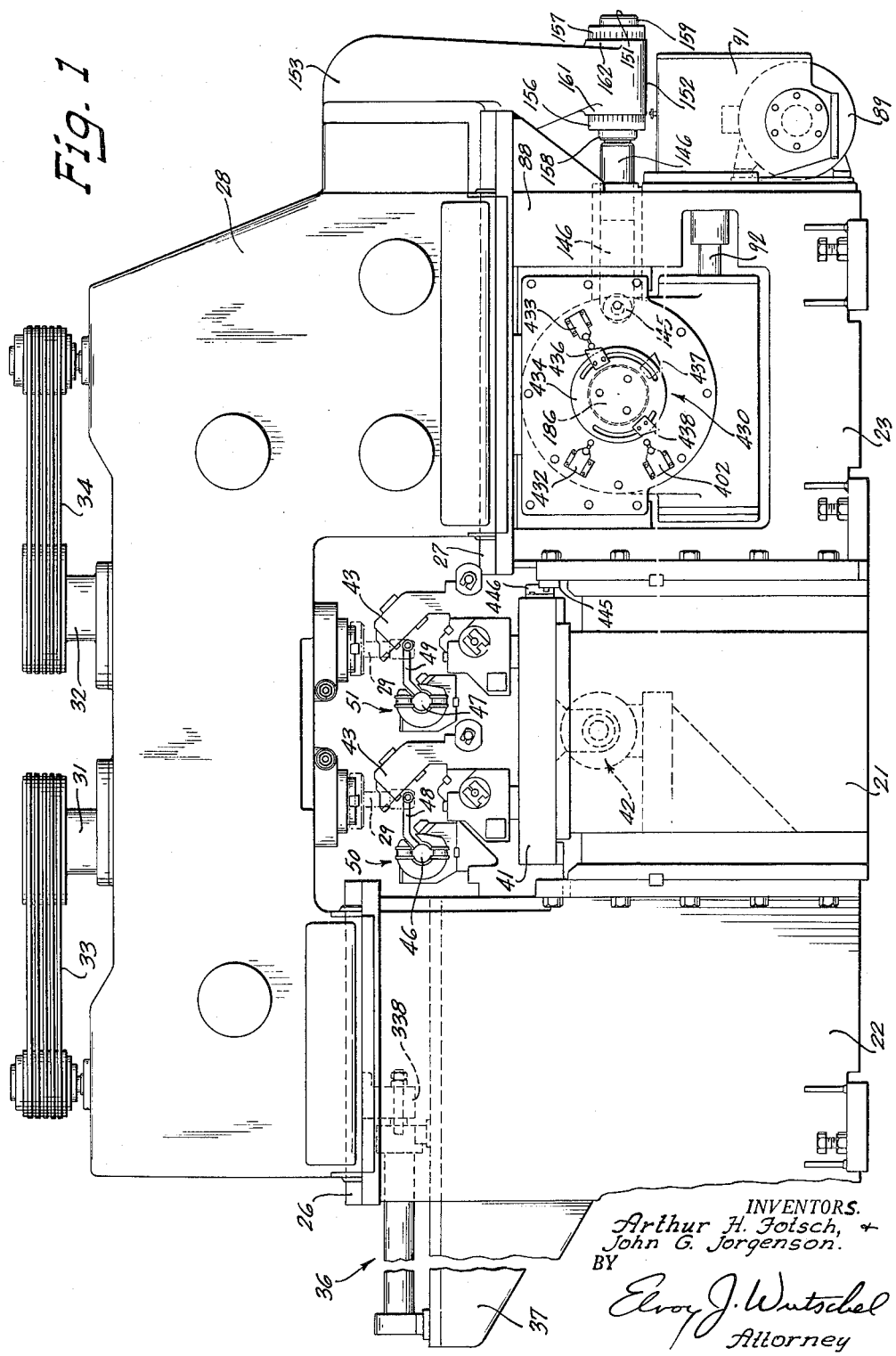

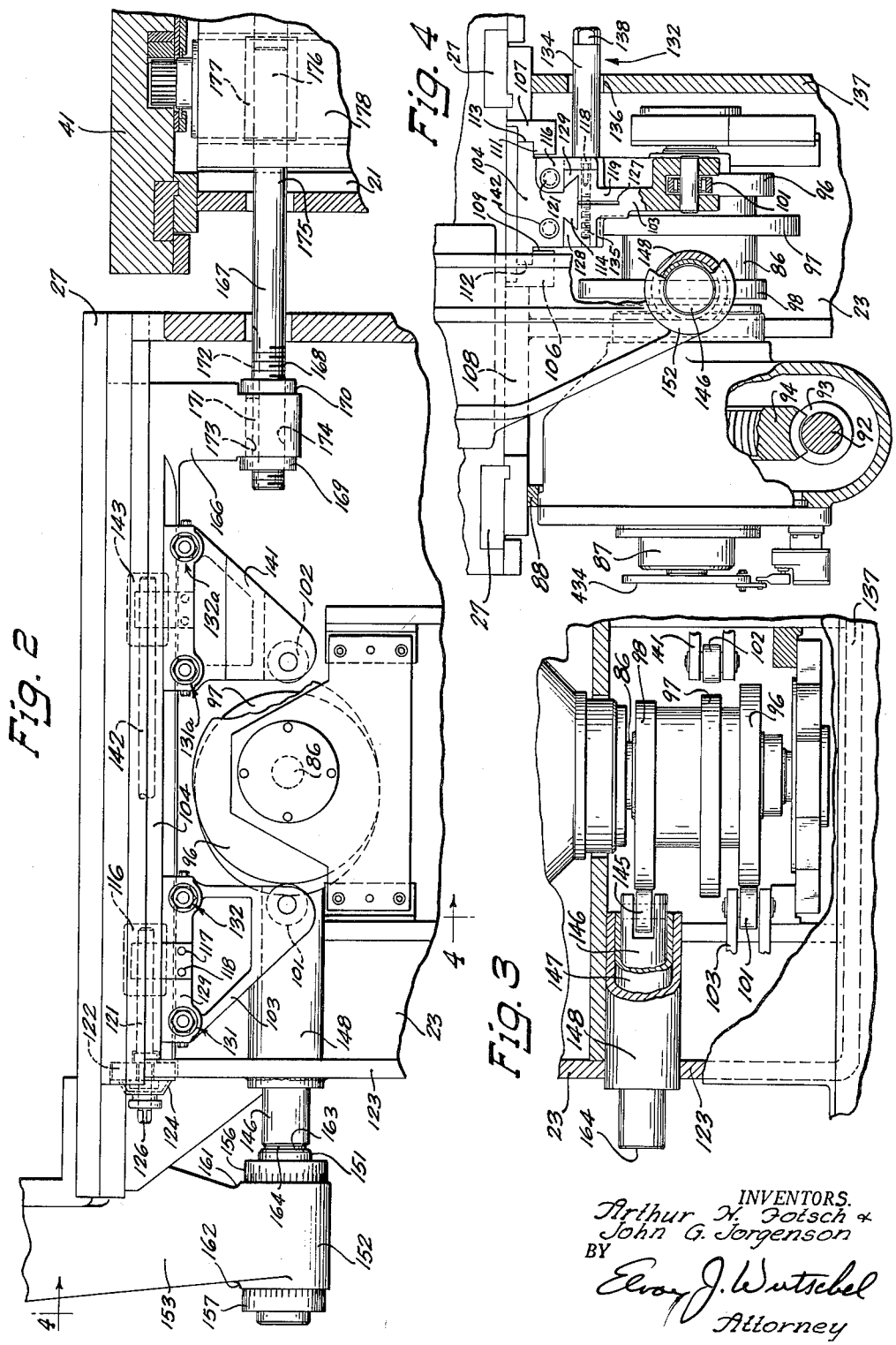

INVENTORS
Arthur H. Fotsch, &
John G. Jorgenson
BY
Elroy J. Wutschel
Attorney

March 27, 1962 A. H. FOTSCH ETAL 3,026,778
MACHINE TOOL
Filed Feb. 28, 1957 5 Sheets-Sheet 5
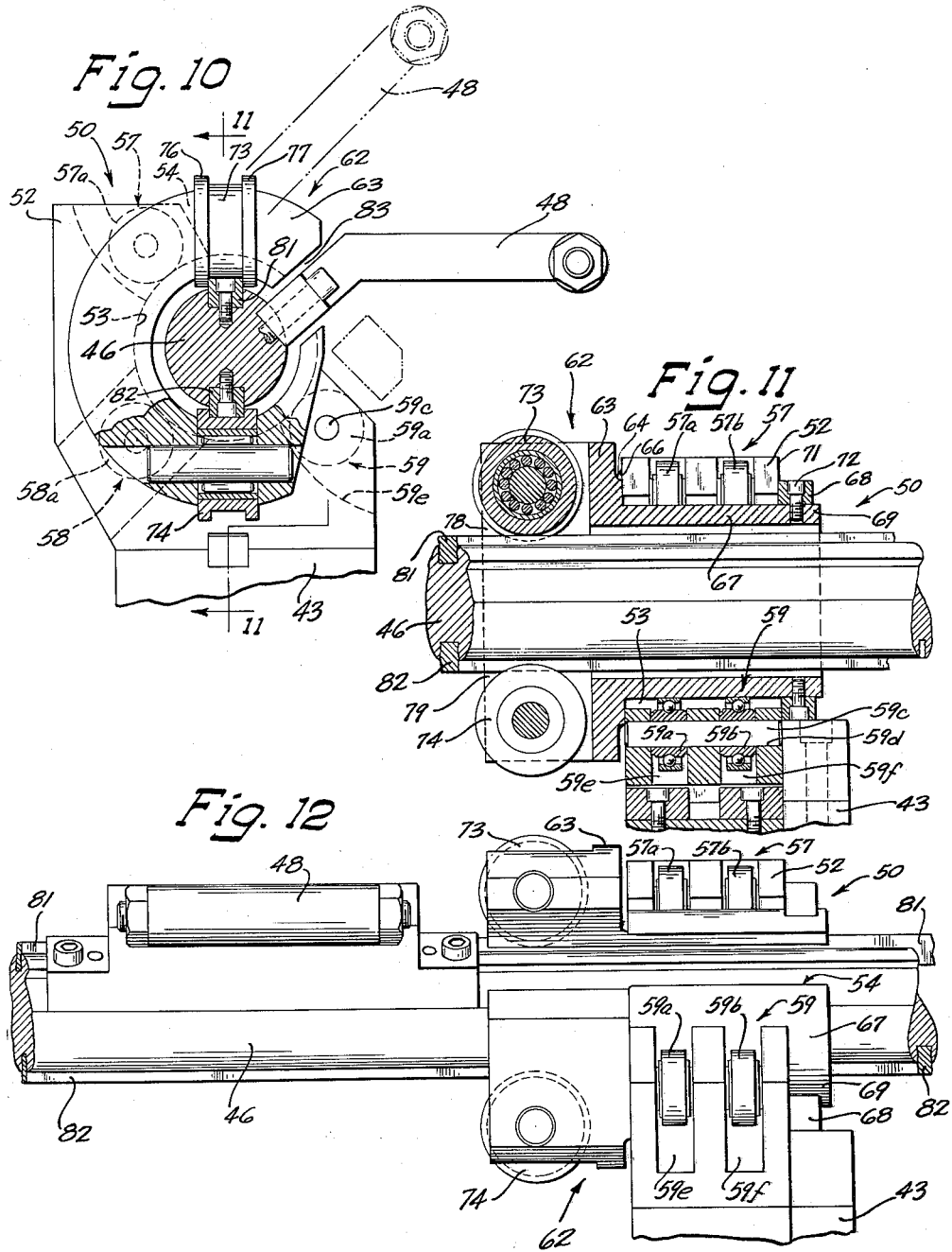
INVENTORS.
Arthur H. Fotsch, &
John G. Jorgenson.
BY
Elroy J. Wutschel
Attorney

# United States Patent Office 3,026,778
Patented Mar. 27, 1962

3,026,778
MACHINE TOOL
Arthur H. Fotsch, Wauwatosa, and John G. Jorgenson, Merton, Wis., assignors to Kearney & Trecker Corporation, West Allis, Wis., a corporation of Wisconsin
Filed Feb. 28, 1957, Ser. No. 643,163
12 Claims. (Cl. 90—15)

This invention relates generally to machine tools and more particularly to a machine tool having a cam controlled feed mechanism.

A general object of the invention is to provide an improved cam controlled feed mechanism for a machine tool.

Another object of the invention is to provide a cam controlled feed mechanism for coordinating and controlling the movements of a plurality of movable members of a machine tool.

Another object of the invention is to provide a cam controlled feed mechanism having adjustable cam followers.

Another object of the invention is to provide control means to initiate the actions of various mechanisms at a predetermined time to effect automatic control of the movable members of a machine tool.

Another object of the invention is to provide an improved mechanical linkage between a movable member of a machine tool and a member supporting a plurality of cam followers associated therewith.

Another object of the invention is to provide a novel means for reducing lost motion between two movable members mechanically linked together for movement in mutually transverse planes.

Still another object of the invention is to provide an improved apparatus for supporting a rotatable and axially movable member.

According to this invention a machine tool, such as a milling machine for milling the interior surfaces of a combustion chamber in an internal combustion engine head is provided with an improved cam controlled feed mechanism whereby the movements of the work supporting member and the tool carrying member of the machine tool are coordinated and controlled so that a workpiece automatically placed in a work position, will have the desired machining operation performed thereon. Moreover, the required machining operation may be repeated on a multiple number of workpieces, without sacrificing any accuracy even though the cutting tool diameter may be changed by reason of its being resharpened or replaced. Such variations in cutter diameter may be readily compensated for by effecting an adjustment of the cam mechanism. The machine is provided with a movable work support actuated by a fluid motor and a movable tool carrying member similarly actuated. The two movable members are movable in mutually transverse directions and both may be actuated simultaneously. To control and coordinate the movement of these members for the purpose of generating a desired pattern, a novel cam controlled feed mechanism is provided. The feed mechanism comprises in general a shaft that is rotatably supported within the machine bed and driven by an independent motor. The shaft has secured to it for rotation therewith a pair of cams each of which control a portion of the movement that the work supporting member is required to make. A third cam is likewise secured to the shaft for rotation with it and controls the movement of the tool carrying member. A pair of cam followers are adjustably secured to a freely movable slide supported in the base of the machine tool. The slide is mechanically connected through a motion transmitting mechanism to the work supporting member in a manner that movement of one will effect movement of the other. The arrangement is such that movement of the work supporting member in one direction will cause one of the cam followers on the slide to engage the program surface of one of the pair of cams and thus, through rotation of the shaft, the program surface on the engaged cam will control the effect that the fluid actuator of the work supporting member exerts thereon. Likewise, when the fluid actuator is reversed to move the work supporting member in the opposite direction, the other cam follower on the slide will engage the second of the pair of cams and likewise control the movement of the work supporting member in the opposite direction. The tool carrying member has an adjustable cam follower plunger which is in engagement with a third cam follower slidably supported in the machine tool and which is in engagement with the third cam on the shaft. Thus, movement of the tool carrying member in one direction is controlled by this cam. Since the cams are simultaneously rotated they effect coordinated control of the two movable members to thereby generate a desired pattern in the workpiece. After continued use, the cutter must be resharpened or replaced periodically, and, to maintain the same workpiece dimensions it has heretofore been necessary in similar arrangements to either replace the cutter with a new cutter of the same original size or to change the control cams. However, with the present invention this is not required, it only being necessary to adjust the three cam followers away from their respective cams the amount that the cutters radius has been reduced.

To maintain a high degree of precision in the control mechanism the motion transmitting mechanism, between the cam follower supporting slide and the work supporting member, is so constructed as to be adjustable to minimize lost motion between the connected members. In general the motion transmitting mechanism comprises a quill rotatably in a housing and adapted to eccentrically support an independently rotatable shaft. The shaft is operably connected to both the slide and the work supporting member in such a manner that movement of either of the members immediately effects movement of the other. The arrangement for adjusting the mechanism is such that rotation of the quill will bodily rotate the shaft about the axis of the quill to effect a closer cooperation in the connection between the shaft and the slide. Provisions have also been provided to adjust the connection between the shaft and the work supporting member to likewise effect a closer cooperation therebetween.

As previously stated the workpieces are automatically positioned in the work position by a transfer bar. To support the transfer bar for rotational and axial movement a novel supporting mechanism has been provided. In general, the supporting mechanism comprises a housing having an axial opening and provided with a plurality of sets of rollers the axis of which are parallel to the axis of the opening in the housing. The rollers are so arranged that a portion of their peripheries extend within the opening to rotatably support an arbor. The arbor is provided with a radially extending flange portion in which is rotatably supported a pair of flanged rollers. The axis of the flanged rollers are disposed transversely of the axis of the arbor and the rollers are so arranged that a portion of their peripheries extends within the opening of the arbor. The transfer bar is supported on these rollers for axial movements. The transfer bar is provided with a pair of trackways for cooperation with the flange rollers whereby the arbor when rotated within the housing rotates the transfer bar by means of the flanges on the rollers cooperating with the trackways on the transfer bar.

The foregoing and other objects of this invention which will become more fully apparent from the following detailed specification of the embodying apparatus shown in the accompanying drawings in which:

FIGURE 1 is a view in front elevation of a milling machine embodying the features of this invention;

FIG. 2 is an enlarged fragmentary detailed view partly in rear elevation and partly in transverse vertical section depicting the right hand bed extension of the machine shown in FIG. 1, illustrating the cam shaft and the two cams for controlling table movement with the associated cam followers mounted on the slide mechanism;

FIG. 3 is an enlarged fragmentary plan view of the cam shaft and cams shown in FIG. 2;

FIG. 4 is an enlarged fragmentary detailed view, generally in vertical section, showing the cam shaft and cams as well as the slide mechanism with the adjustable cam follower thereon, taken along the plane represented by the line 4—4 in FIG. 2;

FIG. 5 is an enlarged fragmentary detailed view substantially in transverse vertical section taken through the table and showing the arrangement of the motion transmitting shafts between the slide and the table, depicted in FIG. 2;

FIG. 6 is an enlarged fragmentary detailed view substantially in longitudinal vertical section, taken generally along the plane represented by the line 6—6 in FIG. 5, with parts broken away showing the arbor rotatably supporting the vertical shaft in engagement with the horizontal shaft that is connected to the slide and in engagement with the adjustable gear rack of the table;

FIG. 7 is a view partly in horizontal section taken along the plane represented by the line 7—7 in FIG. 6;

FIG. 10 is an enlarged detailed elevational view of the support in which the transfer bar is carried for axial and rotational movement with parts broken away to show the lower roller;

FIG. 11 is a view in vertical section of the support of FIG. 10, taken along the plane represented by the lines 11—11 in FIG. 10; and, FIG. 12 is a right side elevational view of the support shown in FIG. 10.

Figures 8, 9:
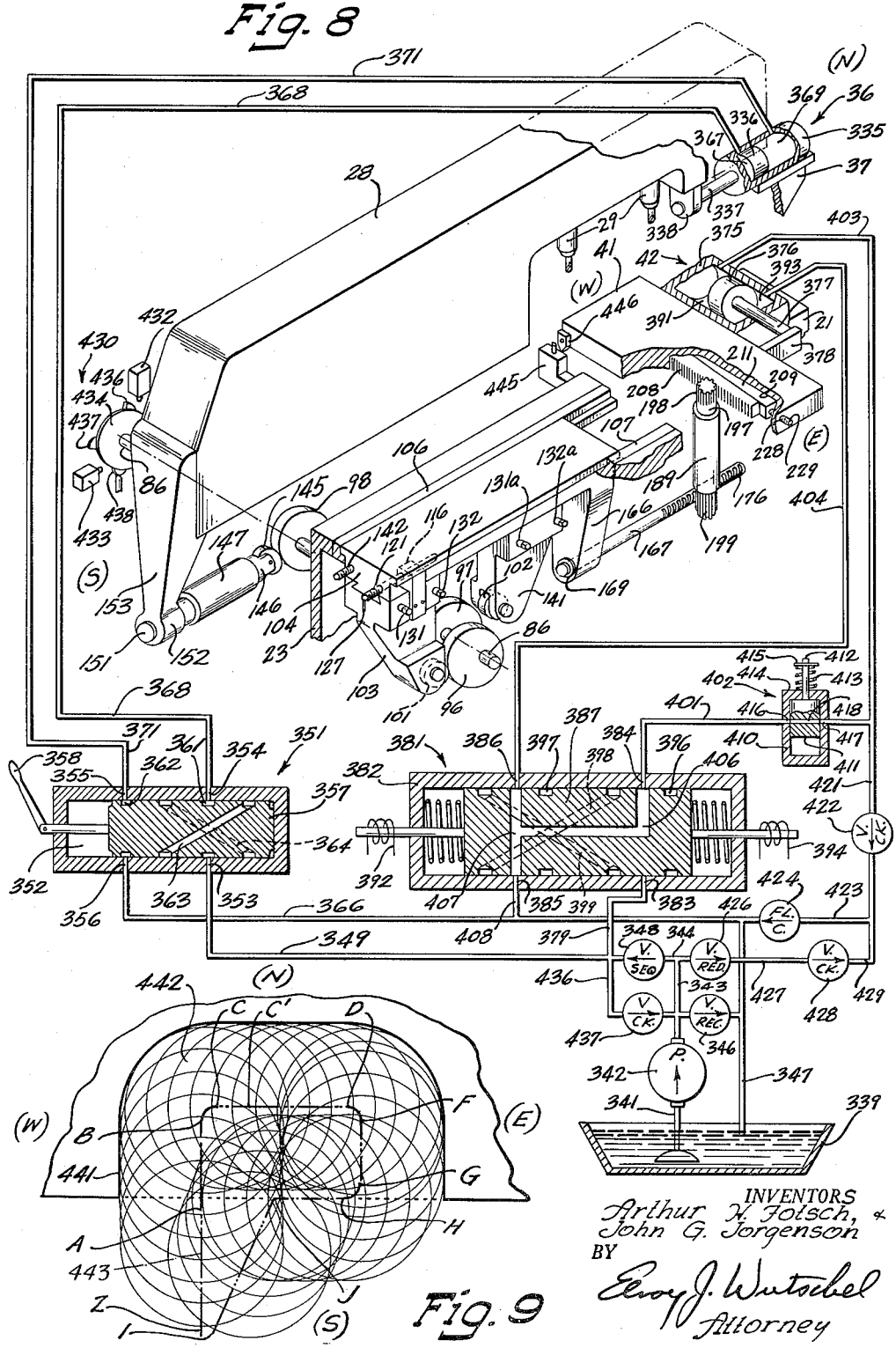
FIG. 8 is a schematic diagram, partly in perspective, illustrating the milling machine of FIG. 1 embodying this invention, with parts omitted, showing the moving elements of the machine employed for producing the coordinated controlled movements of the table and the tool supporting head or bridge, as well as the hydraulic circuit for supplying fluid pressure to the head and table actuators.
FIG. 9 is a schematic view showing the general outline of the path of movement of a tool when machining a combustion chamber in the workpiece.

Referring more specifically to the drawings, the machine tool there shown incorporates a practical, operative embodiment of the features to which this invention is directed, the entire apparatus being fully described herein by way of a complete disclosure.

The machine tool as shown in FIG. 1 comprises a hollow base 21 having left and right hollow base extensions 22 and 23, respectively, which are bolted to the base 21. The left and right base extensions 22 and 23 are each provided with a pair of horizontally disposed ways 26 and 27, respectively, upon which is movably supported a tool carrying bridge head 28. The head 28 is adapted to rotatably carry a plurality of cutters 29 which are disposed in parallel rows. The cutting tools 29 are driven by vertical spindles 31 and 32 which, in turn, are driven by electric motors (not shown) carried on the top portion of the head and connected to drive the respective spindles by means of belt transmissions 33 and 34, respectively. The head 28 is adapted to be moved laterally by means of a piston and cylinder mechanism, generally indicated by the reference numeral 36, supported on a bracket 37 attached to the side of the left base extension 22.

The base 21 slidably supports a table 41 which is adapted to be reciprocated in a direction transverse to the direction of movement of the head 28 by another piston and cylinder mechanism, generally indicated by the reference numeral 42, secured to the base 21. The table 41 carries a plurality of work fixtures 43 which are also disposed in parallel rows, and each of which is adapted to receive workpieces (not shown) supplied to the front of the machine by conveyors (not shown). The workpieces are automatically transferred from a load position, in front of the machine into a work position in the work fixtures 43 by transfer bars 46 and 47. The transfer bars 46 and 47 are provided with a plurality of transfer arms 48 and 49, respectively, secured on each of the transfer bars at spaced intervals. The transfer bars are adapted to remove a finished workpiece from the fixture as they are moving a new workpiece into work position and are supported in position by a plurality of supports. Two of the supports 50 and 51 are shown mounted on the side of the work fixtures 43. The supports 50 and 51 are identical and therefore a description of one of them will suffice for both.

The support 50 supports the transfer bar 46 for axial movement as well as for rotation. To this end the support 50, as best shown in FIGS. 10, 11 and 12, comprises a housing or frame 52 having an axial opening 53. The housing 52 has a longitudinal opening 54, as shown in FIGS. 10 and 12, for purposes which will be more apparent later. The housing 52 is provided with a plurality of sets of rollers 57, 58 and 59 which are spaced apart around the axial opening 53. Each set of rollers comprises two rollers each of which, for purposes of identification, are identified by the set number with a letter symbol as 57a and 57b for the rollers of set 57; 58a and 58b for the rollers of the set 58; and 59a and 59b for the rollers of the set 59. The rollers of each set are supported in the housing 52 in identical manner, therefore the description will be directed to the roller set 59. The rollers 59a and 59b are rotatably supported in the housing 52 on a shaft 59c mounted within an opening 59d, the axis of which is parallel to the axis of the opening 53. The rollers 59a and 59b are located within openings 59e and 59f, respectively, that are provided in the housing 52 and which extend from the outer surface thereof through the housing to communicate with the axial opening 53. As best shown in FIGS. 11 and 12, the rollers 59a and 59b are disposed within their respective openings 59e and 59f in a manner so that a portion of their peripheries extend within the axial opening 53.

An arbor 62 having a radially extending flange portion 63 is rotatably supported within the axial opening 53 of the housing 52 on the three sets of rollers 57, 58 and 59. The arbor 62 is maintained in its axial position within the opening 53 of the housing 52 by means of an annular boss 64 provided on the rear surface of the flange 63 which abuts the front face 66 of the housing 52 while the tubular body portion 67 of the arbor 62 extends through and beyond the housing. A C-shaped ring 68 is engaged on the extending end portion of the arbor and is in snug abutting engagement with the end face 71 of the housing 52 and is secured thereon by screws 72.

The flange portion 63 of the arbor is provided with a pair of rollers 73 and 74 each of which have side flanges 76 and 77. The rollers 73 and 74 are disposed diametrally opposite each other and are housed within frontal openings 78 and 79 provided in the flange 63 and are so arranged as to have a portion of their peripheries extend within the axial opening in the arbor. The flanged rollers 73 and 74 cooperate with trackways or elongated hardened keys 81 and 82 provided in the transfer bar 46 to support the transfer bar for axial movement therein. The arbor 62 is also provided with a longitudinal sectional opening 83 which extends through the flange portion 63 thereof and the tubular portion 67, which opening in conjunction with the longitudinal sectional opening 54 in the housing 52 permits of movement of the transfer arm 48 through the support 50 when the transfer bar is moved axially. Thus, the transfer bar 46 is supported for axial movement in a predisposed position by means of the rollers 73 and 74, while the side flanges 76 and 77 of the rollers cooperate with the sides of the keys 81 and 82 to maintain the transfer bar 46 in the desired position as it is being moved axially. The rotational forces for rotating the transfer bar 46 are transmitted from the arbor 62 through the flanged rollers 73 and 74 to effect the rotary movement of the transfer bar. It is therefore apparent that the transfer bar is carried by the support 50 for rotational and axial movement.

As previously stated the table 41 and the head 28 are reciprocated in mutually transverse directions relative to each other by means of the two pistons and cylinder mechanisms 42 and 36 respectively. To control and coordinate the movement of these two members in order to generate a desired pattern in the workpiece there is provided a novel cam controlled feed mechanism which is operatively disposed within the right hand base extension 23. As best shown in FIGS. 2, 3 and 4, the cam controlled feed mechanism comprises a cam shaft 86 which is rotatably supported in the right hand base extension 23. Power for rotating the shaft 86 is obtained from an electric motor 89, shown in FIG. 1, which is disposed at the right side of the machine at the base thereof. The electric motor 89 is operably connected to drive through a reduction unit 91 secured to the right side of the machine that has a power output shaft 92 extending inwardly into the bed extension 23. The power output shaft 92 has a worm gear 93, FIG. 4, operatively disposed in meshing engagement with a worm wheel 94 secured to the cam shaft 86. The cam shaft 86 has mounted on it for rotation with it three feed control cams 96, 97 and 98. The cams 96 and 97 are utilized for controlling the movement of the table 41, while the cam 98 controls the movement of the head 28.

In order that the cams 96 and 97 be effective to control the movement of the table 41 a pair of cam followers 101 and 102 are supported in position to engage the program surface of their respective cams 96 and 97. The cam follower 101 is rotatably supported in a bracket 103 which is adjustably secured to a slide 104 that is slidably supported on slide rails 106 and 107, shown in FIG 4. The rails 106 and 107 are secured to a top surface plate 108 of the bed extension 23 and are provided with inwardly extending longitudinal supporting flanges 109 and 111, respectively. The rail supporting flanges 109 and 111 slidably support extending side flanges 112 and 113 of the slide 104. The slide 104 is provided with a depending and longitudinally extending dovetail portion 114 on which the cam follower bracket 103 is adjustably and slidably mounted for movement with the slide.

To adjust the bracket 103 on the slide 104 a threaded nut 116 is secured to the bracket 103 by means of a depending lug 117 through which a plurality of screws 118 are inserted into threaded engagement in suitable threaded openings in the body portion 129 of the bracket 103. An adjusting screw 121 isi mounted in a supporting housing 122 secured to the end of the slide 104. The screw 121 is rotatably supported in the housing 122 while being restrained from axial movement. The inner end portion of the screw 121 is threadedly engaged with the nut 116, while the outer opposite end extends outwardly of the supporting housing 122. An indicating dial 124 having suitable indicia thereon is secured to the extending end of the screw 121 and is readable against a reference mark (not shown) provided on the supporting housing 122, in a well known manner. The extreme outer end 126 of the screw 121 is provided with a squared end for receiving a suitable handle or crank (not shown) for rotating the screw 121. Thus, by rotating the screw 121 in one direction or the other the bracket 103 may be moved on the slide 104 to position the follower roller 101 in the desired position in relation to its associated cam 96. By reading the indicia on the dial 124 against the reference point the exact position of the follower 101 in relation to its cam 96 may be easily and accurately determined.

To lock the bracket 103 to the slide 104 a longitudinal extending and relatively deep slot 127 is formed in the bracket 103 to render the support of the side portions 128 and 129 of the body 119 of the bracket 103 relatively resilient. A plurality of relatively long screws 131 and 132 having enlarged tubular body portions 134 and threaded end portions 135 are inserted through suitable openings in the side portion 129 of the bracket 103 into threaded engagement with the side portion 128 of the bracket. The screws 131 and 132 are of sufficient length so as to extend outwardly of the frame of the machine through openings 136 provided in a rear face plate 137. The extreme outer end of the screws 131 and 132 are provided with a wrench receiving head portion 138 to enable the screws to be easily and quickly manipulated from the exterior of the machine. Thus, by applying a suitable wrench to the head portion 138 of the screws 131 and 132 and turning the screws so as to engage them inwardly into the side portion 128, the inner end of the tubular body portion 134 of the screws are tightly engaged against the side portion 129 to urge it into tight engagement with the adjacent dovetail portion of the slide 104 and the side 128 of the bracket is simultaneously drawn towards its adjacent dovetail portion of the slide, thereby effectively locking the bracket 103 to the slide 104.

The follower roller 102 of the cam 97 is similarly mounted in a bracket 141 which is the exact counterpart of the bracket 103 and is similarly adjustably mounted on the slide 104 with the same locking means employed. The bracket 141 has its own adjusting screw 142 engaged in a nut 143 secured to the bracket 141. The adjusting screw 142 of the bracket 141 is disposed parallel to the screw 121 and in the same horizontal plane for convenience of operation. The structural features, and the mounting, adjusting and locking arrangements are identical to the arrangement described in connection with the bracket 103 so that it is not necessary to repeat the description of this structure as it applies to the bracket 141.

The cam 98 is operably connected to control the feed movement of the head 28 by means of a cam follower 145 rotatably mounted in the end of a follower plunger 146 slidably supported in a bearing sleeve 147 mounted in an elongated circular housing 148 secured within the base extension 23. The plunger 146 is disposed in a horizontal plane and extends outwardly of the base extension 23 through the side plate 123 thereof to be engaged by an adjusting plunger 151 as clearly shown in FIG. 2. The adjusting plunger 151 as clearly shown in FIG. 2. The adjusting plunger 151 is adjustably supported for axial movement in a circular housing 152 integrally formed on the end of a depending arm 153 welded or otherwise secured to the right side of the head 28. The adjusting plunger 151 is supported within the housing 152 for axial movement but is restrained from rotational movement by a suitable key (not shown). A pair of adjusting nuts 156 and 157 are threadedly engaged on the extending ends 158 and 159 of the plunger 151 and are adapted to to be in abutting engagement with end faces of bosses 161 and 162 formed on the housing 152. The adjusting nuts 156 and 157 are provided with suitable indicia which are readable against a reference mark (not shown) provided on each of the associated bosses 161 and 162. Thus, if it is desired to move the adjusting plunger 151 outwardly a predetermined amount the adjustment may be made easily and accurately by loosening the nut 156 until the indicia thereon indicated the desired amount of adjustment it is desired to be made in the position of the plunger. It then is a simple matter of turning the nut 157 until the face of the nut 156 abuts the face of its associated boss 161. Since the inner end 163 of the adjusting plunger 151 engages the outer end surfaces 164 of the follower plunger 146 the cam follower roller 101 may be adjustably positioned in respect to its associated cam 98 as desired.

The feed control effectiveness of the cams 96 and 97 is transmitted to the table 41 by means of a mechanical motion transmitting connection. To this end the slide 104 is provided with a depending arm or bracket 166, shown in FIGS. 2 and 8. A shaft 167 is horizontally disposed within the bed extension 23 and has a threaded end 168 extending through a bore 174 of the arm 166 and is secured therein by lock nuts 169 and 170. The shaft 167 is prevented from rotating relative to the arm 166 by means of a key 171 operatively engaged in a keyway 172 provided in the threaded end 168 of the shaft and in a complementary keyway 173 within the bore 174 of the arm 166. The shaft 167 extends outwardly of the bed extension 23 and into the interior of the bed 21, as best shown in FIG. 2. The end 175 of the shaft 167 is provided with a gear rack 176 and, as best shown in FIG. 6, is slidably supported for axial movement within a sleeve 177 fixedly disposed within a housing, that is generally identified by the reference numeral 178, and is mounted within the interior of the bed 21 below the table 41.

As best shown in FIGS. 5, 6 and 7, the housing 178 is a two-piece assembly consisting of a frame portion 179 which is secured to a vertical structural member 181 of the bed 21 by bolts (not shown). The frame 179 is provided with a horizontal bore 182 in which the sleeve 177 is mounted and includes a recess 183 to expose a portion of the sleeve 177 which is also recessed at 184 to expose the gear rack 176 of the shaft 167. A bearing cap 186 is secured to the frame portion 179 by means of a plurality of bolts 187 which extend through suitable openings in the cap 186 and frame 179 and are threadedly engaged in the structural member 181. A bearing portion 188 of the cap 186 cooperates with the recessed section 183 of the frame 179 to form an elongated vertical opening in which a quill 189 is rotatably supported. The quill 189 is retained within the housing 178 by means of an inwardly extending semicircular flange 192 provided at the lower end of the cap 186 and an outwardly extending semicircular flange 193 provided on the lower end of the frame 179. The quill 189 is provided with an opening 194 which is adjacent to the exposed gear rack 176 of the shaft 167 and which extends substantially half-way around the circumference of the quill 189, as clearly shown in FIGS. 6 and 7.

A vertical shaft 197 having an integrally formed gear 198 at its upper end and an integrally formed gear 199 at its lower end is rotatably supported within the quill 189 in a pair of antifriction bearings 201 and 202. The gear 199 of the shaft 197 is disposed to be in meshing engagement with the exposed gear rack 176 on the shaft 167. The shaft 197 is eccentrically arranged in the quill 189 in a manner that its longitudinal axis "X" is parallel to but offset from the longitudinal axis "Y" of the quill, as shown in FIG. 7. The lower bearing 202 is retained in position within the quill 189 by means of a spacer ring 203 and a closure cap 204 which is secured in place by means of a plurality of screws 206 threadedly engaged in the end of the quill 189.

The upper gear portion 198 of the vertical shaft 197 is adapted to be in meshing engagement with a gear rack 208 disposed within a recess 209 provided in the bottom surface of the table 41. The recess 209 is slightly longer than the gear rack 208 in order to fully receive the gear rack therein, as best shown in FIG. 6. The width dimension of the recess 209 is sufficient to provide ample room for the gear portion 198 of the shaft 197, the gear rack 208, a tapered adjusting gib 211 and also to permit of lateral adjustment of these members therein, as clearly shown in FIG. 5. The gear rack 208 and the gib 211 are maintained within the recess 209 by means of a retainer and sealer assembly 212 secured to the bottom surface of the table 41 by a plurality of screws 213. To prevent the gear rack 208 from moving axially within the recess 209 a threaded opening 214 is provided in the end of the table 41 and extends inwardly to communicate with the recess 209. A screw 216 which is partially shown in FIG. 6, is threadedly engaged within the opening 214 into engagement with the end of the gear rack 208 thereby preventing any axial movement of the gear rack 208 within the opening 209. A lock nut (not shown) is threaded onto the outwardly extending end (not shown) of the screw 216 to lock the screw in position in a well known manner. It is therefore apparent that an effective motion transmitting connection has been provided between the slide 104 and the table 41 whereby motion imparted to either the slide or the table is immediately transmitted to the other.

In order that movement of either the table 41 or the slide 104 be imparted immediately to the other it is necessary that the gear portion 198 of the shaft 197 and the gear rack 208 be maintained in tight meshing engagement to eliminate backlash and the gear portion 199 of the shaft 197 must likewise be maintained in tight meshing engagement with the gear rack 176 on the shaft 167 to avoid backlash, and any wear occurring between the gears must be compensated for. Adjustment of the gears to eliminated backlash is accomplished by rotating the quill 189 within the housing 178. Since the shaft 197 is eccentrically mounted for independent rotation within the quill 189, as previously described, the shaft 197 will be rotated bodily around the axis "Y" of the quill 189. Such rotation of the shaft 197 will cause a similar movement of the gear portion 199 of the shaft 197 so that it may thereby be adjusted to effect a tight engagement with the gear rack 176 on the shaft 167 and backlash between the two gears will be eliminated.

To accomplish rotation of the quill 189 and lock it in an adjusted position, a bar or arm 220 is secured to the lower end of the quill 189 by means of screws 221. The arm 220 has one end 222 extending outwardly to a position below the cap 186. The cap 186 is provided with a pair of lugs 223 and 224 which extend outwardly thereof and which are located on either side of the arm 220. A pair of adjusting screws 226 and 227 are threadedly engaged in the lugs 223 and 224, respectively, and are adapted to engage the sides of the arm 220, as shown in FIGS. 5 and 7. Thus, by loosening the screw 227 and tightening the screw 226 the quill 189 may be easily and quickly rotated to maintain a tight meshing engagement between the gear 199 and the gear rack 176. When the quill has been rotated the desired amount it may be maintained in that position by simply tightening the screw 227 against the arm 220.

As described above the gear 199 may be maintained in tight meshing engagement with the gear rack 176 by rotating the quill 189 thereby bodily rotating the shaft 197. However, such rotation of the shaft 197 will also move the upper gear portion 198 out of tight meshing engagement with the gear rack 208. To re-establish a tight meshing engagement between the gear rack 208 and the gear 198 the gear rack must be moved laterally to the left, as viewed in FIG. 5. To this end, the tapered gib 211 is moved inwardly to force the gear rack 208 into tight meshing engagement with the gear 198. To move the tapered gib 211 inwardly an opening 228, as shown in FIG. 8, is provided in the end of the table 41 which also communicates with the recess 209. A screw 229 is threadedly engaged in the opening 228 into engagement with the enlarged end of the tapered gib 211. By engaging the screw 229 inwardly the gib 211 is forced inwardly to move the gear rack 208 into tight engagement with the gear 198 on the shaft 197. It is apparent from the foregoing description that novel means have been provided for maintaining the various gears of the motion transmitting connection in tight meshing engagement with each other.

A hydraulic circuit has been provided for supplying fluid under pressure to the fluid actuators 36 and 42, respectively, for effecting movement of the head 28 and the table 41. The hydraulic circuit in conjunction with various valves and switches functions to actuate and control the movable members in a complete cycle of operation.

The fluid actuator 36 for the head 28 comprises a cylinder 335 that is secured to the bracket 37. A piston 336 is movably supported within the cylinder 335 for reciprocation and is provided with a piston rod 337 which extends outwardly of the cylinder 335 and has its extending end connected to a bracket 338 that is secured to the head 28. Fluid pressure is supplied to the actuator 36 from a reservoir 339 through a supply pipe 341 connected to the inlet side of a pump 342. From the pump 342 fluid under pressure is directed through a line 343 to a distribution line 344. A pressure relief valve 346 is connected to the line 343 and has its outlet side connected to a reservoir return line 347. The relief valve serves to set the maximum feed pressure in the hydraulic circuit. Fluid pressure from the distribution line 344 is directed through a sequence valve 348 and a line 349 to a manually positionable four-way distribution valve 351 which operates to direct the fluid pressure to one side or the other of the piston 336 of the actuator 36.

The valve 351 comprises a valve body 352 having four ports 353, 354, 355 and 356. A plunger 357 is contained within the valve body 352 and is manually positionable to either of two positions by manipulating a handle 358 that is operatively connected to the plunger 357.

For the purpose of selectively passing fluid pressure through the valve 351 the plunger 357 is provided with two annular grooves 361 and 362 about its periphery. The grooves 361 and 362 serve as connecting passages between ports 353 and 354, and ports 355 and 356, respectively, whenever the plunger 357 is positioned to the right within the cylinder 352, as shown in FIG. 8. Internally formed in the plunger 357 are two passages 363 and 364 which serve to connect ports 353 and 355 together, and ports 354 and 356 together, whenever the handle 358 is moved to position the plunger 357 to the left. The port 353 of the valve 351 is connected to receive fluid pressure from the line 349. The port 356 of the valve is connected to the reservoir return line 347 by a line 366. Port 354 of the valve is connected to a chamber 367 on the rod side of the piston 336 in the cylinder 335 by a line 368. The port 355 of the valve is connected to a chamber 369 on the head side of the piston 336 in the cylinder 335 by a line 371.

The fluid actuator 42 for the table 41 comprises a cylinder 375 that is secured to the bed 21 and has a piston 376 therein. The piston 376 is provided with a piston rod 377 which extends outwardly of the cylinder 375 having its free end connected to a bracket 378 secured to the table 41. Fluid pressure is supplied to the actuator 42 from the line 349 by a branch line 379 which is connected to a pressure fluid inlet port of a distribution valve 381 which operates to direct fluid pressure to one side or the other of the piston 376 of the actuator 42.

The valve 381 comprises a valve body 382 having four ports 383, 384, 385 and 386. A movable plunger 387 is contained within the valve body 382 and is normally maintained in a centered or neutral position by springs 388 and 389 interposed between the end faces of the plunger 387 and the ends of the valve body 382, as shown in FIG. 8. The plunger 387 is selectively positionable either to the left to direct fluid pressure to a chamber 391 in the cylinder 375 on the head side of the piston 376 by a solenoid 392; or, to the right to direct the fluid pressure to a chamber 393 on the rod side of the piston 376 by a solenoid 394.

For the purpose of selectively passing fluid pressure through the valve 381, the plunger 387 is provided with two annular grooves 396 and 397 about its periphery. The annular grooves 396 and 397 serve as connecting passages between ports 383 and 384, and ports 385 and 386, respectively, when the solenoid 392 is energized to move the plunger 387 leftwardly, as viewed in FIG. 8. Internally formed in the plunger 387 are two passages 398 and 399 which connect ports 384 and 385 together, and ports 383 and 386 together, when the solenoid 394 is energized to move the plunger 387 rightwardly. The port 384 of the valve 381 is connected to the chamber 391 of the actuator 42 by a line 401, a mechanically operated two-way valve 402, and a line 403. The port 386 of the valve 381 is connected to the chamber 393 of the actuator 42 by a line 404. To enable the table 41 to be moved manually, two other passages 406 and 407 are provided in the plunger 387, the passage 406 being in communication with the passage 407. The passages 406 and 407 connect the ports 384, 385 and 386 together when the plunger is in the central or neutral position. The port 385 of the valve 381 serves as an exhaust port and is connected to the reservoir return line 366 by a line 408. Thus, when the valve 381 is in the neutral position fluid pressure cannot enter the valve and the chambers 391 and 393 are opened to the exhaust line 366 to free the table for manual movement.

The valve 402 is a mechanically operated two position valve having a valve body 410 in which a movable plunger 411 is supported. The plunger 411 is provided with a rod 412 which extends outwardly of the valve body 410. A compression spring 413 is engaged about the extending portion of the rod 412 and engages against the outer surface of the end 414 of the valve body 410, while the opposite end thereof engages a plate or washer 415 secured to the free end of the rod 412. Thus, the plunger 411 is maintained in the upper portion of the valve body 410 and constitutes the normal open position of the valve. The valve body 410 is provided with ports 416 and 417 which receive the ends of the lines 401 and 403, respectively. The plunger 411 is provided with a passage 418 which is so located as to connect the ports 416 and 417 together when the valve is in its normal open position.

When the valve 402 is actuated to its closed position and fluid pressure is being directed to the chamber 393 of the actuator 42, a controlled fluid exhaust circuit is provided which controls the rate at which the piston 376 will move the table 41. The control exhaust circuit comprises a line 421, connected to the line 403, a check valve 422, a line 423 and a flow control valve 424 having its outlet side connected to the reservoir return line 347.

However, when the valve 402 is closed and the exhaust fluid from the chamber 391 is returned to the reservoir via the controlled fluid exhaust circuit, the sudden impact of exhaust fluid upon the flow control valve 424 will have a tendency to momentarily build up a back pressure in the chamber 391 causing the table 41 to be momentarily stopped and then suddenly urged forward in the direction of its movement. This momentary stop and resultant "jump" forward is undesirable and results in imperfections in the finished surfaces of the workpieces and damage of the cutter. To eliminate this condition the flow control valve 424 is maintained active when the controlled exhaust circuit is inoperative. To this end a supply of fluid pressure is directed from the supply line 344 through a pressure reducing valve 426, a line 427, a check valve 428 and a line 429 which is in communication with the line 423. Thus, the flow control valve 424 is maintained active during the time that the valve 402 is normally opened and any tendency of the table 41 to "jump" when the valve 402 is actuated to a closed position, is eliminated.

To effect automatic control of the various valves to accomplish a complete cycle of operation there is provided a control mechanism 430, as shown in FIG. 1 and schematically in FIG. 8, which actuates limit switches 432 and 433 and the valve 402 at predetermined points in the cycle of operation. The control mechanism 430 comprises a control plate 434 which is secured to the outwardly extending end of the cam shaft 86 for rotation with it. The plate 434 is provided with a plurality of adjustable dogs 436, 437 and 438 which are disposed so as to individually engage a particular limit switch or valve. The limit switches are electrically connected to the solenoids 392 and 394 in well known manner.

For a clear understanding of the operation of the machine a description of a complete operating cycle will be given. This description will be given with reference to FIG. 9 where a fragmentary portion of the workpiece "W" is shown and in which the outline 441 represents the contour of one of the combustion chambers in the workpiece in which it is desired that the tool perform a milling operation on the sides and bottom thereof. The circular outlines 442 represent the outline of the tool as it rotates to perform the work operation, and the outline 443 represents the path which the axis of the tool will be made to follow to accomplish the desired operation. The path of travel of the cutter to machine the combustion chamber as defined by the outline 441 is established by the cams 96, 97 and 98. During a portion of the machining operation, the hydraulic actuators 36 and 42 urge the head 28 and table 41 in a direction to maintain the followers 101, 102 and 145 in engagement with their cooperating cams but yield to the operation of the cams to enable the cams to effect the necessary movements of the head 28 and table 41 for producing the required relative movement between the workpiece and the cutter to produce the desired contour.

Assuming that at a start of a cycle of operation the axis of the head 28 and table 41 are in retracted positions the cutter 29 will then be in the start position represented at "Z" of the outline 443. The operation will be described with reference to a single cutter performing an operation in a single combustion chamber. It is also obvious that in order to mill in both the vertical and horizontal plane in one operation the diameter of the cutter will be such that the milling action in the horizontal plane must overlap so that a complete milling action in the horizontal plane is completed in one cycle of operation as shown by the outline 442. In order to clearly identify the direction of movements of the head 28 and the table 41 the cardinal points of the compass will be used. That is North and South, represented in FIGS. 8 and 9 as (N) and (S), will designate the direction in which the head 28 is movable, and East and West, represented by (E) and (W) designate the direction in which the table 41 is movable.

Assuming now that a cutter of desired size has been selected for milling the interior of the combustion chamber the three cams 96, 97 and 98 may then be generated which will have the desired program control surfaces provided on their peripheries. These cams then may be secured to the shaft 86 in proper relationship with their respective cam followers. The cam follower 101 is then engaged against the periphery of its associated cam 96. This is accomplished by simply loosening the clamp screws 131 and 132 which frees the bracket 103 on the slide 104. By rotating the adjusting screw 121 the bracket may be moved inwardly to engage the cam follower 101 with the periphery of the cam 96. When the follower 101 is adjusted to the desired position the clamp screws 131 and 132 are tightened to lock the bracket 103 to the slide 104. Likewise, the cam follower 145 is engaged against the periphery of the cam 98 by loosening the adjusting nut 156 and tightening the adjusting nut 157 thereby moving the adjusting plunger 151 inwardly against the follower plunger 146 to move the cam follower into contact with the cam 98. The follower is locked in position by tightening the adjusting nut 156. The cam follower 102 is now spaced apart from its associated cam 97, as shown in FIGS. 3 and 8. By loosening the lock screws 131a and 132a the bracket 141 is freed on the slide 104 and is moved until the follower roller 102 is spaced the desired distance from the cam 97. When the desired position of the follower is attained, the lock screws 131a and 132a are tightened to lock the bracket to the slide.

The distance that the follower 102 is spaced from its cam 97 is determined by the size of the cutter selected to perform the machining operation. The selection of the cutter is predicated in this instance on the size of the chamber. In other words, the cutter selected must be of a size so that in a cycle of operation the cutter will operate on the sides of the chamber and will also mill the bottom surface thereof. Therefore, in operating upon the bottom surface, the cutter must be such that when the center of the cutter travels the path represented by the line "F" to "J" it will overlap the surface already operated upon when the center of the cutter was traveling the path represented by the line "B" to "F." This overlapping insures a margin of extension of cutter life. That is, in a production operation the cutter must be sharpened at intervals, thereby reducing the diameter of the cutter. Therefore, the initial cutter size must be such that the cutter may be repeatedly sharpened, within the limits of good practice, and still overlap the area previously operated upon. However, a reduction in the diameter of the cutter will result in a corresponding reduction in the dimensions between the side walls of the chamber that is being machined in the workpiece for an established setting of the cam followers. To compensate for a reduction in the diameter of the cutter, all that is necessary is to adjust the cam followers 101, 102 and 145 away from their associated cams a distance corresponding to the amount that the cutter radius has been reduced. With this arrangement, the cams need not be replaced and the same dimensions of the combustion chamber may be maintained.

After the adjustment of the cam followers has been made, and a workpiece has been moved into a work position in the machine, the operator presses a cycle start switch (not shown) which energizes the motor 89 to rotate the feed cams 96, 97 and 98 while the pump 342 is constantly driven by another motor (not shown). At the time the cycle start switch is actuated to energize the motor 89 the solenoid 392 of the valve 381 is also energized to position the plunger 387 therein to the left. Fluid pressure is then directed from the pump 342 through lines 343 and 344 to the sequence valve 348. From the sequence valve 348 the fluid pressure is conducted to the inlet port 383 of the valve via lines 349 and 379. It is to be noted that the pressure of the fluid in the line 343 is regulated by means of the relief valve 346 which establishes the maximum pressure in the system. Fluid pressure entering the valve 381 via port 383 is directed through the valve via the groove 396 to the port 384. From the port 384 the fluid pressure is directed through the line 401 to the valve 402. The valve 402 at this time is in its normally open position and passes the fluid pressure through it to the line 403 and thence to the chamber 391 of the fluid actuator 42 to urge the table 41 to the right as viewed in FIG. 8 or the eastward direction. The table being urged toward (E) effects a movement of the slide 104 in the (N) direction to force the follower 101 against the cam 96.

Fluid in the chamber 393 of the actuator 42 is exhausted via the line 404 to port 386 of the valve 381 and by means of the groove 397 out through port 385. From the port 385 fluid returns to the reservoir 339 by the lines 408, 366 and 347.

At the time that fluid pressure is admitted to the chamber 391 of the table actuator 42, fluid pressure is also furnished to the chamber 367 of the head actuator 36. To this end, fluid pressure in the line 349 also passes to the port 353 of the valve 351. The plunger 357 of the valve 351 being normally positioned, as shown in FIG. 8, the fluid pressure enters port 353 and by means of the groove 361 in the plunger passes through the valve to port 354 and by line 368 into chamber 367 of the actuator 36. Fluid pressure in the chamber 367 urges the head toward (N) thereby forcefully engaging the follower 145 against the cam 98. It is to be noted that the valve 351 is maintained in the position, shown in FIG. 8, at all times and is only positioned leftwardly when it is desired to fully retract the head 28 toward (S) for a tool change.

With the events occurring as described, the control effect of the cam 96 will balance the pressure exerted on the piston 376 to maintain the table 41 stationary. Meanwhile the rotating cam 98 will present a receding program surface to the cam follower 145 permitting the head to be moved toward (N) by its actuator 36 at a predetermined feed rate. With reference to FIG. 9, the head 28 will feed across the table 41 with the cutter 29 moving from the point "Z" to a point "B," the table 41 being maintained stationary during this interval.

When the cutter 29 has reached the point "B" of the cutter path outline 443, the program surface on the rotating cam 96 is such as to overcome the actuator 42 of the table 41 to force the table toward (W) at a predetermined feed rate. Meanwhile, the program surface on the head cam 98 is such as to permit the head 28 to continue to be moved toward (N) by its actuator 36 at a controlled feed rate. The coordinated movements of the head and table enables the cutter 29 to follow the curve "B—C." In forcing the table 41 to move toward (W) the fluid pressure in the chamber 391 of the table actuator 42 is returned to the reservoir 339 against the pressure of the pump 342. Thus, fluid is forced out of the chamber 391 and back through the line 403. From the line 403 the fluid is forced through the valve 381 via port 384, the groove 396 of the plunger and out through the port 383 into the line 379. From the line 379 fluid returns to the reservoir 339 via the line 436, the check valve 437 into the supply line 343. From the supply line 343 the fluid pressure will be relieved through the relief valve 346 and the line 347 to the reservoir 339. The cams 96 and 98 control the movement of the table 41 and head 28, respectively, until the cutter 29 reaches a position designated at "C." When the cutter 29 has completed traversing the path of the curve "B—C," the program surface on the head cam 98 is such as to maintain the head 28 stationary. The cam 96 continues to force the table 41 toward (W) until the cutter reaches the position "C'." When the cutter is in the position "C'" the dog 436 on the control plate 434 contacts the limit switch 432 to de-energize the solenoid 392 and energize the solenoid 394 of the valve 381 to position the plunger 387 thereof to the right within the valve body 382. Fluid pressure now will be directed from the port 383 through the passage 399 to port 386 and thence via the line 404 to the chamber 393 of the table actuator 42. Fluid pressure supplied to the chamber 393 of the table actuator 42 will now cause the table to be urged toward (W).

At the time that the solenoid 394 is energized to direct fluid pressure to the chamber 393 of the table actuator 42 another dog 438 on the control plate 434 contacts the rod 412 of the valve 402 to close the valve. Fluid in the chamber 391 is now exhausted to the reservoir 339 via the lines 403, 421 through the check valve 422 and line 423 to the flow control valve 424. The valve 424 has previously been set at a predetermined setting to effect control of the rate at which the table 41 will be moved toward (W). Fluid will pass through the valve 424 into the line 366 and return to the reservoir via the line 347.

At this time fluid pressure is still continued to the chamber 367 of the head actuator 36 which continues to urge the head 28 toward (N) to maintain the follower 145 in contact with the cam 98. The program surface on the cam 98, at this time, being such as to maintain the head 28 stationary. Thus, the table 41 is moved toward (W) hydraulically by the actuator 42. The table 41 in moving toward (W) effects a reversal in the direction of movement of the slide 104 toward (S). The slide 104 in moving in the direction of (S) moves the follower 101 out of contact with its associated cam 96 while moving the follower 102 toward the cam 97. The table 41 is thus fed hydraulically toward (W) until the follower 102 engages the cam 97 which then assumes control of the table feed movement. At the time the follower 102 contacts the cam 97, the dog 438 on the control plate 434 will be rotated free of the rod 412 of the valve 402 to allow the valve to open. Fluid exhausted from the chamber 391 of the actuator 42 will now return to the reservoir via the line 403, valve 402, line 401 and enter the valve 381 through port 384. Fluid entering the port 384 will pass through the valve via the passage 398 and out through port 385 to line 408 and into the return line 366. The table 41 and head 28 will be controlled by the cams 97 and 98, respectively, in the described manner until the cutters 29 reach a position designated at "D," in FIG. 9.

At this time the program surfaces on the cams 97 and 98 are so coordinated as to cause the cutter to follow the curve "D—F." To effect this travel, since the head is urged toward (N) by its actuator 36, the program surface of the head cam 98 is such as to overcome the action of the actuator 36 to cause the head to move toward (S). In forcing the head toward (S) the fluid under pressure in the chamber 367 is forced back through the line 368 through port 354 of the valve 351 and out through port 353 via the groove 361. From the port 353 fluid is returned to the reservoir against the pressure of the pump 342 via the line 349 and a line 436 through a check valve 437 to the fluid pressure line 343. Since the relief valve 346 is set at a predetermined setting the fluid returned against the pressure of the pump 342 will exhaust through the valve to the reservoir. Simultaneously, the table cam 97 controls the rate at which the table is moved by the actuator 42 toward (W). Thus, the movements of the head 28 and the table 41 are coordinated so as to enable the cutter 29 to follow the curve "D—F," as represented in FIG. 9.

When the cutter 29 reaches the position represented at "F," in FIG. 9, the program surface on the table cam 97 serves to maintain the table stationary while the head cam 98 continues to effect a movement of the head toward (S) at a predetermined feed rate. The fluid in the chamber 367 still being exhausted to the reservoir against the pressure of the pump 342, as described. This condition continues for the distance represented by the line "F—G."

When the cutter 29 arrives at the point "G" in its path of travel, the head cam 98 continues to overcome the action of the actuator 36 to maintain movement of the head toward (S) at a predetermined feed rate. At the same time the table cam 97 exerts a force on its cooperating roller 102 to overcome the action of the table actuator 42 and force the table toward (E). These coordinated movements of the head and table enable the cutter 29 to follow the outline "G—H." Since the cam 98 is forcing the head toward (S) against the action of fluid pressure in the chamber 367 of the actuator 36, the fluid pressure circuit will now act as a fluid return circuit and fluid will return to the reservoir 339 via the line 368, port 354, annular groove 361, port 353, the line 349, the line 436, the check valve 437, the relief valve 346 and line 347. Likewise, the fluid pressure in the chamber 393 of the table actuator 42 will be exhausted therefrom against the pressure of the pump 342 and also return to the reservoir via the line 404, port 386, passage 399, port 383, lines 379, 436, check valve 437, relief valve 346 and the line 347.

From the position "H" the cutter follows the line "H—J" to complete the operation upon the workpiece.

To this end the program surface on the head cam 98 now is such as to maintain the head 28 stationary while the table cam 97 continues to overcome the effect of the fluid pressure in the chamber 393 of the actuator 42 to continue movement of the table 41 toward (E) until the cutter reaches the position represented at "J," in FIG. 9. The fluid in chamber 393 is returned to the reservoir against the pressure of the pump 342, as previously described.

When the position "J" has been reached the milling operation on the workpiece has been completed and the program surface on the head cam 98 is such as to return the head 28 to its starting position. Simultaneously with the return of the head 28 to the start position the table will be returned to a position slightly beyond its start position. Thus, the cutter will follow the line from "J—I." When the head 28 and table 41 are retracted and the cutter 29 is positioned at the position "I," another dog 437 on the control plate 434 will have been rotated into position to contact another limit switch 433 to stop the cam shaft motor 89, and to de-energize the solenoid 394 and energize the solenoid 392 of the valve 381. Since the pump 342 is being continuously driven, fluid pressure is still delivered to the chamber 367 of the head actuator 36 maintaining the follower 145 in contact with the head cam 98. However, since the cams are no longer rotating, the cam 98 will maintain the head in its retracted position. At this time the plunger 387 of the valve 381 has been positioned to the left in the valve body 387 due to the action of the dog 437 on the limit switch 433 which energized the solenoid 392. Fluid pressure will then be directed from the port 383 of the valve 381 through the valve by means of the groove 396 and out through the port 384. Fluid pressure will be delivered to the chamber 391 of the table actuator 42 via the line 401, the open valve 402 and the line 403. Thus, the table 41 will move hydraulically toward (E) a distance, represented in FIG. 9, as "I" to "Z," this distance being the distance that the follower 102 was originally spaced from its cam 97. In moving from "I" to "Z" the table 41 will effect a movement of the slide 104 to move the cam follower 101 into engagement with the cam 96 while moving the cam follower 102 away from its cam 97. When the table 41 reaches the initial start position, another limit switch 445, shown in FIG. 1 and diagrammatically in FIG. 8, is contacted by a dog 446 secured to the table 41 to de-energize the solenoid 392 allowing the plunger 387 to return to its neutral position and thus stopping table movement and completing a cycle of operation.

It is apparent that the invention described is particularly valuable in production operations where the same cycle of operation is applied to a multitude of workpieces. In this type of operation the cutters are required to be resharpened periodically for maximum efficiency. A sharpening of the cutter, of course, necessarily results in a reduction of its diameter. To compensate for the reduction in cutter diameter, all that is necessary is to adjust the cam followers 101, 102 and 145 away from their respective cams the amount that the cutter radius has been reduced. This adjustment being easily and quickly accomplished in the manner previously described. Thus, once the cams 96, 97 and 98 have been provided for the desired outline to be generated, they are usable as long as the particular operation is to be performed.

While the invention has been described in relation to a particular work operation, it should be apparent that the invention is adaptable to generate different contours having two parallel sides wherein it is necessary to maintain the parallel sides a predetermined distance apart for a range of cutter diameters.

Although the foregoing detailed description and accompanying drawings are directed to a particular apparatus for the purpose of fully disclosing an exemplifying operative embodiment of the invention, it is to be understood that the particular structures shown and herein described are intended to be illustrative only, and that the various features of the invention may be incorporated in other forms and constructions without departing from the spirit and scope of the invention as defined in the subjoined claims.

The principles of this invention having now been fully explained in connection with the foregoing description, we hereby claim as our invention:

1. In a machine tool having a reciprocable work supporting table and a tool carrying head reciprocably movable in a direction transversely to the direction of movement of said table, a fluid actuator operably connected to reciprocate said table, a first cam, a first cam follower adjustably connected to said table in position to be engageable with said first cam as said fluid actuator moves said table in one direction to urge said first cam follower into engagement with said first cam, means operably connected to reverse the action of said fluid actuator to effect movement of said table in the opposite direction, a second cam, a second cam follower adjustably connected to said table in position to be engageable with said second cam at a predetermined time as said table is moved in the opposite direction to urge said second cam follower into engagement with said second cam, a fluid actuator operably connected to reciprocate said head, a head cam, a head cam follower adjustably carried by said head and adapted to be retained in engagement with said head cam, a single means operably connected to rotate all of said cams simultaneously as said fluid actuators are urging their associated members in their respective paths of travel, whereby said cams will be rotated and said cam followers will coact with their associated cams to effect coordinated movement of said table and said head to thereby effect the generation of a predetermined pattern in the work.

2. In a machine tool having a cutter carrying member and a work carrying member reciprocably movable in mutually transverse paths, a rotatable cam shaft, three cams secured to said cam shaft for rotation with it, a slide, a motion transmitting mechanism operably connected to said slide and to the work carrying member in a manner so that movement of one of them will effect movement of the other, a first cam follower adjustably secured to said slide in position to be engageable with a first one of said cams to control the movement of the work carrying member when the member is urged in one direction and said first cam is rotated, a second cam follower adjustably secured to said slide in position to be engageable wih a second one of said cams to control the movement of the work carrying member when the member is urged in the opposite direction and when said second cam is rotated, a third cam follower adjustably connected to said cutter carrying member in position to be engageable with the third one of said cams to control the movement of the cutter carrying member when the member is urged in one direction and said third cam is rotated, a first power source operably connected to move the cutter carrying member in its path of travel, a second power source operably connected to reciprocate the work supporting member, a third power source operably connected to rotate said cam shaft, means operably connected to effect simultaneous operation of said first and second power sources, means operably connected to effect simultaneous operation of said third power source with the operation of said first and second power sources, and operable means connected to reverse the direction of operation of said second power source to effect a reversal in direction in which the work carrying member is urged after a predetermined amount of rotation of said cams whereby the movements of the work and the cutter carrying members when urged in one direction of their respective paths of travel are controlled and coordinated by said first and third cams according to the program surface thereon and when said second power source is reversed to urge the work carrying member in the opposite direction at a predetermined point on the program surface of said first cam the work carrying member is moved free of cam control until said second cam follower engages its associated cam to control the movement of the work carrying member according to the program surface of said second cam.

3. In a machine tool organization, a base, a work supporting member carried on said base for reciprocable movement, power means connected to move said work supporting member in its path of travel, a tool carrying member carried on said base for reciprocable movement in a direction transverse to the direction of movement of said work supporting member, power means connected to move said tool carrying member in its path of travel, a slide movably supported by said base, motion transmitting means conecting said slide and said work supporting member in a manner so that movement of one will effect movement of the other, a pair of brackets adjustably secured to said slide, individual adjusting means carried by said slide and connected to said brackets to position said brackets on said slide in any desired position, individual indicator means associated with each of said bracket adjusting means to indicate the amount of movement of said brackets on said slide from an initial position, locking means operable to lock said brackets to said slide in a desired adjusted position, a shaft rotatably supported in said base, power means operably connected to rotate said shaft, a first cam secured to said shaft for rotation therewith, a first cam follower on one of said brackets and positioned to be engageable with said first cam so that said rotating first cam controls the movement of said work supporting member when said member is urged in one direction, a second cam secured to said shaft for rotation therewith, a second cam follower carried by said tool carrying member and operably disposed so as to be engageable with said second cam so that said rotating second cam controls the movement of said tool carrying member when said member is urged in one direction, adjusting means operably connected to position said second cam follower relative to said second cam, said second cam follower adjusting means having indicating means to indicate the amount of movement of said follower from an initial position, a third cam secured to said shaft for rotation with it, a third cam follower secured to the other of said brackets in position to be engageable with said third cam so that said rotating third cam controls the movement of said work supporting member when said member is urged in the opposite direction, means connected to actuate said power means of said work supporting member to urge said work supporting member in one direction, means operably connected to actuate said power means of said tool carrying member to urge said tool carrying member in one direction, means operably connected to effect reversal of the work support power means to urge said work supporting member in an opposite direction at a predetermined point on said first cam, whereby the movement of said work supporting member is no longer controlled by said rotating first cam and said work supporting member is urged in the opposite direction by said power means with no control except that which is inherent in said power means, the duration of uncontrolled movement of said work supporting member being continued until said third cam follower engages said rotating third cam to control the movement of said work supporting member in the opposite direction, said duration being defined by the adjusted position of said third cam follower in respect to its associated cam, means operably connected to stop said power means of said shaft to stop rotation of said shaft upon completion of one revolution of said shaft, and means operably connected to stop the operation of said power means of said work supporting member.

4. In a machine for milling the internal surface of a combustion chamber in the head of an internal combustion engine comprising, a base, a work supporting member reciprocably movable in a fixed path of travel on said base, a tool carrying member reciprocably movable in a fixed path of travel transverse to the path of travel of said work supporting member on said base, a first fluid power means operably connected to said work supporting member to move it, a second fluid power means operably connected to said tool carrying member to move it, a shaft rotatably journalled in said base, a power source operably connected to said shaft to rotate it, a first feed control cam for said work supporting member, a second feed control cam for said work supporting member, a third feed control cam for said tool carrying member, said cams being secured to said shaft for simultaneous rotation, a slide supported in said base for reciprocable movement, motion transmitting mechanism operably connecting said slide and said work supporting member whereby movement of one of them will effect movement of the other, a first feed control cam follower adjustably secured to said slide and normally positioned in engagement with said first feed control cam by the operation of said first fluid power means urging said work supporting member in a direction to effect engagement of said first feed control cam follower with said first feed control cam so that the cam when rotated controls the feeding movement of said work supporting member in one direction of travel, a second feed control cam follower adjustably secured to said slide and normally positioned a predetermined distance from said second feed control cam and engageable with said second feed control cam to control the movement of said work supporting member when said work supporting member is moved in the opposite direction, a third feed control cam follower for said third feed control cam adjustably carried by said tool carrying member and normally positioned in engagement with said third cam by the operation of said second fluid power means urging said tool carrying member in a direction to effect engagement of said third feed control cam follower with said third feed control cam so that the cam when rotated controls the feeding movement of said tool carrying member in one direction of travel, means operably connected to effect automatic reversal of the action of said first fluid power means to effect a movement of said work support in the opposite direction at a predetermined time, means to automatically stop rotation of said cam shaft after one revolution, and means to recondition said first fluid power means to its initial condition and to stop it, whereby said first feed control cam and said third feed control cam cooperate to move their respective members in coordinated relationship to effect a partial completion of the pattern desired while said second feed control cam and said third feed control cam cooperate to effect a different coordinated movement of the same respective members to complete the pattern.

5. In a machine tool organization, a work support, a tool support, said supports being adapted to be moved in mutually transverse directions, a fluid actuator for each of said supports operatively connected therewith to effect relative movement between said supports, a shaft, power means connected to rotate said shaft, a first cam secured to said shaft for rotation with it and having a feed program surface, a first cam follower adjustably connected to said work supporting member in position to be engageable with the program surface of said first cam to control the movement of said work supporting member when said work supporting member is urged in one direction and said first cam is rotated, a second cam secured to said shaft for rotation with it and having a program surface comprising a feed portion and a retraction portion, the retraction portion of the program surface of said second cam being adapted to effect a positioning of said work supporting member to a position beyond the initial start position of said work supporting member, a second cam follower adjustably conected to said work supporting member in position to be engageable with the program surface of said second cam to control the movement of said work supporting member when said work supporting member is urged in the opposite direction and said second cam is rotated, a third cam secured to said shaft for rotation with it and having a program surface comprising a feed portion and an extended retraction portion, the retraction portion of the program surface of said third cam being adapted to return said tool supporting member to its initial start position and to retain it in the initial start position, a third cam follower adjustably connected to said tool supporting member in position to be engageable with the program surface of said third cam to control the movement of said tool supporting member when said tool supporting member is urged in one direction and said third cam is rotated, a source of fluid pressure, means operably connecting said source of fluid pressure to said fluid actuator of said tool supporting member to urge it in one direction to forcefully engage said third cam follower with said third cam, a valve operatively connected to selectively direct the flow of fluid pressure from said source to said fluid actuator of said work supporting member to actuate said fluid actuator in one direction or in the opposite direction or to interrupt the flow of fluid pressure to said actuator, said valve being normally conditioned to block the flow of fluid pressure to said actuator of said work supporting member, means operably connected to condition said valve to direct fluid pressure to said actuator of said work supporting member to urge said member in a direction to forcefully engage said first cam follower with said first cam, said means being also connected to simultaneously actuate said power means for operation of said shaft, a plate secured to said shaft for operation with it, second means operably connected to condition said valve to direct fluid pressure to said actuator of said work supporting member to urge said work supporting member in the opposite direction to forcefully engage said second cam follower with said second cam, a first dog on said plate in position thereon to actuate said second means at a predetermined instance in the cycle of operation, third means operably connected to condition said valve to direct fluid pressure to said actuator of said work supporting member to urge said work supporting member in its original direction of movement, a second dog on said plate in position to actuate said third means when said tool support has been returned to its initial start position by said third cam reacting upon said third cam follower and said work supporting member has been moved to a position beyond its start position by said second cam reacting upon said second cam follower to thereby retain said tool supporting member in its initial start position as said work supporting member is moved by its actuator from a position beyond its initial start position as established by said second cam to its initial start position, a fourth means operably connected to condition said valve to interrupt the flow of fluid pressure to said actuator of said work supporting member, a third dog secured to said work supporting member in position to actuate said fourth means when said work supporting member has been returned to its initial start position, and individual adjusting means operably connected to each of said cam followers to adjust the position of said followers relative to their associated cams, whereby the movements of said work supporting member and said tool supporting member may be controlled and coordinated according to the programs on said cams to generate a desired pattern and said cam followers may be positioned relative to their associated cams to maintain the desired pattern regardless of a variation in the size of the tool.

6. In a cam control mechanism for a machine tool having a base that carries two members movable relative to each other in mutually transverse directions, first second, and third cams rotatably carried by the base, power means operably connected to rotate said cams, a first adjustable cam follower operably connected to the first of the members in position to be engageable with said first cam when the member is urged in one direction so that said rotating first cam controls the movement of the first of the movable members in one direction, a second adjustable cam follower operably connected to the first movable member in position to be engageable with said second cam when the member is urged in the opposite direction so that said rotating second cam controls the movement of the first movable member in the opposite direction, a third adjustable cam follower operably connected to the second of the members in position to be engageable with said third cam when the member is urged in one direction so that said rotating third cam controls the movement of the second of the movable members in one direction, individual adjusting means for each of said cam followers operably connected to adjust the position of said followers relative to their associated cams, individual power means operably connected to urge the movable members in their individual paths of travel, whereby when the members are urged in one direction the first and third cam followers are forcefully engaged with their associated cams to control and coordinate the movements of the members according to the program surface on said first and third cams, and when the first of the members is urged in the opposite direction while the second of the members is urged in its original direction said first cam follower is moved out of engagement with its associated cam and said second cam follower is moved into position to forcefully engage its associated cam and the movement of the members is controlled by said second and third cams according to the programs surface thereon.

7. In a cam control mechanism for a machine tool having a work supporting member and a tool carrying member supported for reciprocation in mutually transverse directions, individual actuators operably connected to move the work supporting and the tool carrying members in their paths of travel, a shaft, a plurality of feed control cams carried by said shaft for synchronized rotation, a motor operably connected to rotate said shaft, a slide element, a motion transmitting mechanism operably connected to said slide element and to the work supporting member in a manner so that movement of one will effect movement of the other, said motion transmitting mechanism including operable means for adjusting said motion transmitting mechanism to eliminate lost motion between said slide element and the work supporting member, a first cam follower adjustably mounted on said slide in position to be engageable with the first of said cams to control the movement of the work supporting member in one direction when said first cam is rotated, a first adjusting means carried on said slide element and operably connected to move said first cam follower on said slide to vary its position relative to said first cam, a second cam follower adjustably mounted on said slide in position to be engageable with a second one of said cams to control the movement of the work supporting member in the opposite direction when said second cam is rotated, a second adjusting means carried in said slide and operably connected to move said second cam follower on said slide to vary its position relative to said second cam, separate releasable locking means for said first and second cam follower to lock said followers in an adjusted position on said slide, a third cam follower adjustably connected to said tool carrying member in position to be engageable with a third one of said cams to control the movement of the tool carrying member in one direction when said third cam is rotated, adjusting means operably connected to adjust said third cam follower relative to said third cam, said adjusting means being operable to lock said third cam follower in an adjusted position, whereby said first and third cam followers may be positioned relative to their associated cams to coordinate and control the movements of the work supporting member and the tool carrying member when they are separately urged in one direction of their path of travel and said cams are rotated, and said second cam follower may be positioned relative to its associated cam and operate in conjunction with said third cam follower and its associated cam to coordinate and control the movements of the work supporting member and the tool carrying member when the tool carrying member is continued to be urged in the same direction and the work supporting member is urged in its other direction of travel.

8. In a cam control mechanism for a machine tool having a tool carrying member and a work supporting member reciprocable in mutually transverse directions, a shaft, a plurality of feed control cams carried by said shaft for synchronized operation, a slide carried by the machine tool and operably connected to the work supporting member in a manner so that movement of one of them will effect movement of the other, individual piston and cylinder mechanisms connected to move the members in their paths of travel, a first cam follower connected to said slide in position to be engageable with said first feed control cam, said first feed control cam being operable to control the movement of the work supporting member in one direction when rotated, a second cam follower for the second of said feed control cams adjustably secured to said slide in position to be engageable with said second feed control cam, said second feed control cam being operable to control the movement of the work supporting member in the opposite direction when rotated, a third cam follower for the third of said feed control cams connected to the tool carrying member in position to be engageable with said third feed control cam, said third feed control cam being operable to control the movement of the tool carrying member in one direction when rotated, power means connected to effect operation of said feed control cams, a source of fluid pressure, a valve connected to direct fluid pressure selectively to one side or the other of the piston of said piston and cylinder mechanism of the work supporting member when actuated to urge the work supporting member in one direction to forcefully engage said first cam follower with said rotating first feed control cam or to urge the work supporting member in the opposite direction to forcefully engage said second cam follower with said rotating second feed control cam, said valve being normally disposed to interrupt the flow of pressure to said piston and cylinder mechanism of the work supporting member, means operably connected to direct fluid pressure to one side of the piston of said piston and cylinder mechanism of the tool carrying member to urge the member in its path of travel to forcefully engage said third cam follower with said rotating third feed control cam, means operably connected to condition said valve to direct fluid pressure to one side of the piston of said piston and cylinder mechanism of the work supporting member to urge the member in one direction and to simultaneously actuate said power means to operate said feed control cams to urge the members in their paths of travel as said cams are operated and said first and third cam followers are engaged with their respective rotating cams to follow the program surface thereon to control the movement of the members in one direction, a plate secured to rotate with said feed control cams, a first switch connected to said valve to condition said valve to direct fluid pressure to the opposite side of the piston of said piston and cylinder mechanism of the work supporting member when actuated to reverse the direction in which the work supporting member is urged, a first dog adjustably secured to said plate and positioned to actuate said first switch at a predetermined point in the cycle of operation, the work supporting member thereupon being moved solely through the action of its piston and cylinder mechanism until said second cam follower engages its associated rotating second feed control cam to esablish control over the movement of said work supporting member in the opposite direction according to the program surface on said rotating second feed control cam, a second switch connected to said power means of said shaft and said valve to stop said power means and to condition said valve to its first condition when actuated, a second dog adjustably secured to said plate and disposed to actuate said second switch at another predetermined point in the cycle of operation when the tool carrying member has been retracted to its start position by operation of said third feed control cam and the work supporting member has been moved to a position beyond its start position by action of said second feed control cam, whereby said tool carrying member will be retained in its retracted position by said third cam and the work supporting member will be returned to its start position by action of its actuator, a third switch connected to said valve to condition said valve to its normal condition when actuated, and a dog secured to the work supporting member in position to actuate said third switch when the work supporting member has been returned to its start position.

9. In a control mechanism for a machine tool to coordinate the movement of two members reciprocably movable in mutually transverse directions, a frame, a shaft rotatably supported by said frame, power means operably connected to rotate said shaft, first, second, and third cams carried by said shaft for rotation with it, a slide movably carried by said frame, a first gear rack operably connected to said slide, a second gear rack operably connected to one of said members and adapted to be adjusted laterally, a motion transmitting shaft operably connected to said first gear rack and to said second gear rack to effect related movement of said slide and said member, said motion transmitting shaft being rotatable about its axis for transmitting the motion of said slide to said member and the motion of said member to said slide, means operably connected to effect independent bodily rotation of said motion transmitting shaft about an axis offset relative to the rotational motion transmitting axis of said shaft, means operably connected to effect lateral adjustment of said second gear rack, whereby said motion transmitting shaft may be rotated bodily to maintain a tight engagement of said shaft with said first gear rack and said second gear rack may be moved laterally to maintain a tight engagement between said second gear rack and said motion transmitting shaft, first and second cam followers adjustably secured to said slide in position to be engageable with said first and second cam members respectively to control the movement of said member when said member is urged in one direction or the other and said cams are rotated by virtue of the motion transmitting connection established by said motion transmitting shaft, first and second means carried by said slide and operably connected to said first and second cam followers respectively to adjust said cam followers on said slide to effect a positioning of said cam followers relative to their associated cams, a third cam follower adjustably connected to the other of said members in position to be engageable with said third cam to control the movement of said other member when said other member is urged in one direction and said third cam is rotated, adjusting means carried by the other of said members and operably connected to adjust said third cam follower on said other member to effect a positioning of said third cam follower relative to its associated third cam.

10. In a machine tool having a cutter carrying member and a work carrying member reciprocably movable in mutually transverse paths, a rotatable cam shaft, a first cam, a second cam, and a third cam, said cams being secured to said cam shaft for rotation with it, a movable slide, a first gear rack secured to said slide, a motion transmitting shaft supported for rotation about its axis, said motion transmitting shaft having its axis disposed normal to the direction of movement of said slide, a gear secured to said motion transmitting shaft and disposed in meshing engagement with said first gear rack, a second gear rack carried by the work carrying member and operably disposed so as to be adjustable laterally, a second gear carried by said motion transmitting shaft and disposed in meshing engagement with said second gear rack, means operably connected to rotate said motion transmitting shaft about an axis parallel to its axis but offset therefrom in a manner to effect a tight meshing engagement of said first gear with said first rack to eliminate backlash therebetween, means operably connected to adjust said second gear rack laterally into tight engagement with said second gear to eliminate backlash between said second gear and said second rack, a first cam follower adjustably secured to said slide in position to be engageable with said first cam to control the movement of the work carrying member that is connected to said slide through said motion transmitting shaft when said member is urged in one direction and said first cam is rotated, a second cam follower adjustably secured to said slide in position to be engageable with said second cam to control the movement of said work carrying member that is connected to said slide through said motion transmitting shaft when said member is urged in the opposite direction and said second cam is rotated, a third cam follower adjustably connected to the cutter carrying machine tool member in position to be engageable with said third cam to control the movement of the cutting carrying machine tool member when the member is urged in one direction and said third cam is rotated, a first power source operably connected to move the cutter carrying member in its path of travel, a second power source operably connected to reciprocate the work carrying member, a third power source operably connected to rotate said cam shaft, means operably connected to effect simultaneous operation of said first and second power sources, means connected to effect operation of said third power source simultaneously with the operation of said first and second power sources, and means operably connected to reverse the direction of operation of said second power source to effect a reversal in direction in which the work carrying member is urged after a predetermined amount of rotation of said cams, whereby the movements of the work and the cutter carrying members when urged in one direction of their respective paths of travel are controlled and coordinated by said first and third cams according to the program surface thereon and when said second power source is reversed to urge the work carrying member in the opposite direction at a predetermined point on the program surface of said first cam the work carrying member is moved free of cam control until said second cam follower engages its associated cam to control the movement of the work carrying member according to the program surface of said second cam.

11. In a drive mechanism for driving a movable member of a machine at predetermined rates in its path of travel; a power actuator operably connected to urge the movable member in its path of travel in either direction; a pair of cams rotatably supported in the machine and connected to be rotated for regulating the feeding movement of the movable member; and cam follower means supported for movement with the movable member in position to engage the first of said pair of cams when the movable member is urged in a forward direction by said power actuator and to engage the second of said pair of cams when the movable member is urged in a reverse direction by said power actuator so that said pair of cams regulate the feeding movement of the movable member in either direction of travel, said pair of cams being so coordinated that during a portion of the path of travel of the movable member said cams are not in contact with said follower means.

12. In a feeding mechanism for driving a movable member of a machine in its feeding movement; a power actuator operably connected to urge the movable member in its path of travel in either direction; a pair of cams rotatably supported in the machine and connected to be rotated for regulating the feeding movement of the movable member; a first cam follower supported for movement with the movable member in position to engage the first of said pair of cams when the movable member is urged in a forward direction by said power actuator to cause said first cam to regulate the feeding movement of the movable member in the forward direction of travel; and a second cam follower supported for movement with the movable member in position to engage the second of said pair of cams when the movable member is urged in a reverse direction by said power actuator to cause said second cam to regulate the feeding movement of the movable member in the reverse direction of travel; whereby said pair of cams being so coordinated that during a portion of the path of travel of the movable member said cams are not in contact with said follower means and the travel of the movable member is then under the sole control of said power actuator.

References Cited in the file of this patent

UNITED STATES PATENTS

| | | |
|---|---|---|
| 686,726 | Griffiths et al. | Nov. 19, 1901 |
| 1,627,858 | Morgal | May 10, 1927 |
| 1,879,548 | Sethman | Sept. 27, 1932 |
| 1,938,781 | Nenninger et al. | Dec. 12, 1933 |
| 2,163,836 | Haas | June 27, 1939 |
| 2,355,554 | Parsons | Aug. 8, 1944 |
| 2,374,719 | Armitage | May 1, 1945 |
| 2,392,963 | Armitage et al. | Jan. 15, 1946 |
| 2,402,179 | Nord | June 18, 1946 |
| 2,521,209 | Fether | Sept. 5, 1950 |
| 2,532,213 | Wilcox et al. | Nov. 28, 1950 |
| 2,559,839 | Andrew et al. | July 10, 1951 |
| 2,872,853 | Hoern | Feb. 10, 1959 |